(12) United States Patent
Bao et al.

(10) Patent No.: US 10,457,870 B1
(45) Date of Patent: Oct. 29, 2019

(54) CHIRAL COMPOUND, LIQUID CRYSTAL COMPOSITION CONTAINING THE SAME, OPTICALLY ANISOTROPIC BODY, AND LIQUID CRYSTAL DISPLAY DEVICE

(71) Applicant: SHIJIAZHUANG CHENGZHI YONGHUA DISPLAY MATERIAL CO., LTD., Shijiazhuang, Heibei (CN)

(72) Inventors: Yongfeng Bao, Shijiazhuang (CN); Guoliang Yun, Shijiazhuang (CN); Jinsong Meng, Shijiazhuang (CN); Ming Li, Shijiazhuang (CN); Hubo Zhang, Shijiazhuang (CN); Lei Zhao, Shijiazhuang (CN); Zhian Liang, Shijiazhuang (CN)

(73) Assignee: SHIJIAZHUANG CHENGZHI YONGHUA DISPLAY MATERIAL CO., LTD., Shijiazhuang, Hebei (CN)

( * ) Notice: Subject to any disclaimer, the term of this patent is extended or adjusted under 35 U.S.C. 154(b) by 0 days.

(21) Appl. No.: 16/039,573

(22) Filed: Jul. 19, 2018

(30) Foreign Application Priority Data

May 15, 2018 (CN) .......................... 2018 1 0458947

(51) Int. Cl.
*G02F 1/1333* (2006.01)
*C09K 19/34* (2006.01)
(52) U.S. Cl.
CPC ................ *C09K 19/3402* (2013.01)
(58) Field of Classification Search
CPC .......................... C09K 19/3402; G02F 1/1333
USPC ..................................................... 252/299.61
See application file for complete search history.

(56) References Cited

U.S. PATENT DOCUMENTS 7,318,950 B2 * 1/2008 Kirsch ................. C09K 19/322
  252/299.01
9,458,125 B2 * 10/2016 Sago .................... C07D 319/06

* cited by examiner

*Primary Examiner* — Geraldina Visconti
(74) *Attorney, Agent, or Firm* — Paratus Law Group, PLLC

(57) ABSTRACT

Disclosed are a chiral compound, a liquid crystal composition containing the chiral compound, an optically anisotropic body and a liquid crystal display device. The structural formula of said chiral compound is as represented by the following formula I:

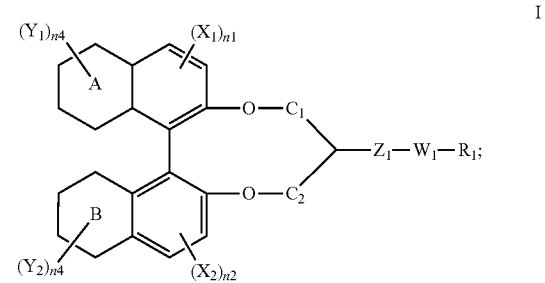

The chiral compound has a high HTP value and a good solubility; a highly helical, twisted liquid crystal composition can be prepared by adding a small amount of the chiral compound; reducing the addition amount of the chiral compound can reduce the negative effect of the chiral compound on the parameters of the liquid crystal composition; under the conditions of the same addition ratio and the same helical pitch, the chiral compound can reduce the response time of the liquid crystal composition; in addition, the chiral compound has a simple structure and greatly reduces the synthesis cost.

8 Claims, 1 Drawing Sheet

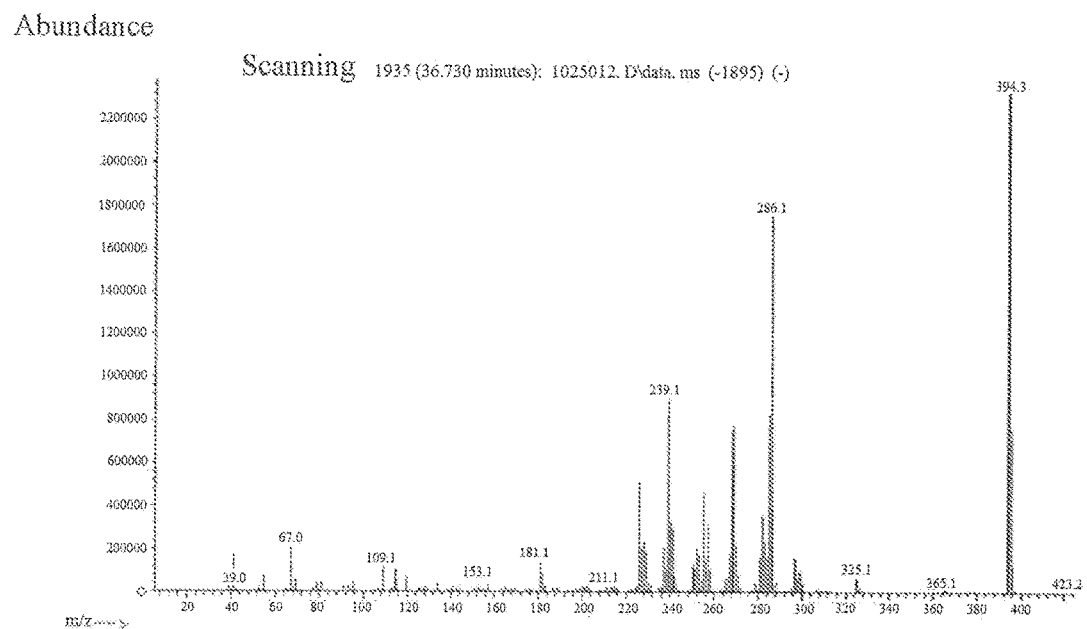

CHIRAL COMPOUND, LIQUID CRYSTAL COMPOSITION CONTAINING THE SAME, OPTICALLY ANISOTROPIC BODY, AND LIQUID CRYSTAL DISPLAY DEVICE

CROSS REFERENCE TO PRIOR APPLICATION

This application claims priority to Chinese Patent Application No. 201810458947.5 (filed on May 15, 2018), which is hereby incorporated by reference in its entirety.

TECHNICAL FIELD

The present invention relates to the technical field of liquid crystal materials. More specifically, the present invention relates to a chiral compound, a liquid crystal composition containing the chiral compound, an optically anisotropic body, and a liquid crystal display device.

BACKGROUND ART

Liquid crystals have a variety of phase states, such as a smectic phase arranged in a lamellar manner, a nematic phase and a cholesteric phase with a helical structure, wherein the nematic liquid crystals can be further classified according to the relative orientation of molecules, and the smectic phase is the most common arrangement manner, in which the molecules are arranged in layers. Another common phase is the cholesteric phase, or referred to as a chiral nematic phase, in which the orientation of each layer of molecules is slightly twisted from the adjacent layer, thereby forming a helical, twisted structure in natural state. When a voltage is applied to such a liquid crystal, a corresponding angle will be twisted in the direction of the applied voltage. Therefore, it can be used to control the passage of light.

A chiral compound can be used as a dopant to induce or enhance the helical twisting of a liquid crystal composition used in a liquid crystal display. At a specific temperature, the helical twisting power (HTP) value of a chiral additive that causes helical twisting of a pure enantiomeric nematic liquid crystal composition by using the chiral additive has the following relationship with the resulting helical pitch, p, of the nematic liquid crystal composition and the concentration, c, of the chiral additive in the nematic liquid crystal composition:

$$HTP = \frac{1}{pc}$$

wherein the unit of the helical pitch, p, is μm; the concentration, c, of the chiral additive can be expressed as a molar fraction, a weight fraction or a weight percent without any unit, and 0-1 is generally used for a weight fraction (e.g., 1 wt % is expressed as 0.01 in weight fraction), and the optical purity of the chiral additive (enantiomeric excess) is generally very close to pure. It can be seen from the above-mentioned formula that a short helical pitch can be achieved by means of a large HTP value or a large addition amount.

The existing disclosed chiral additives are, for example, as described in patents WO 2002006195, WO 9800428, WO 2007039104, WO 2007039105 and WO 2005023742; however, the chiral additives in the prior art generally have a low HIP value, a low solubility or a complicated synthesis process.

In some cases, the liquid crystal composition is required to have a strong helical twisting power, i.e., a smaller pitch, p. If the HIP value of the chiral additive is low, a higher amount of addition is required so as to adjust to a desired smaller pitch, p, and a high amount of addition may bring about more negative effects to the electrooptical properties, such as a dielectric anisotropy ($\Delta\varepsilon$), an optical anisotropy ($\Delta n$), a clearing point (Cp), a viscosity ($\gamma 1$), a driving voltage and a response time, of the nematic liquid crystal composition.

A low solubility in the liquid crystal composition can lead to unwanted crystallization at low temperatures; at this point, two or more different chiral additives need to be added to avoid crystallization; in addition, the addition of two or more different chiral additives must achieve mutual compensation of the twisting temperature coefficients of different chiral additives.

Therefore, it is very necessary to provide a chiral additive having a high HTP value which is easy to synthesize and has a good solubility in a liquid crystal composition.

SUMMARY OF THE INVENTION

An objective of the present invention is to provide a chiral compound having a high HIP value, which not only can reduce the use amount of the chiral compound, but also can reduce costs, and can also achieve a smaller change in the performance of a liquid crystal composition.

In order to achieve the above-mentioned objective, the technical solution used in the present invention is as follows:

a chiral compound, the structural formula of which is as represented by the following formula I:

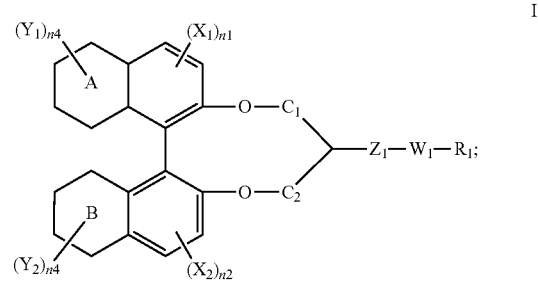

in said formula I, A and B are each independently selected from any one of cyclohexyl, phenyl, phenyl with at least one —CH— substituted with N, and cyclohexyl with at least one —$CH_2$— substituted with S or O;

$X_1$, $X_2$, $Y_1$ and $Y_2$ are each independently selected from at least one of F, CN, an alkyl group having 1-12 carbon atoms, an alkoxy group having 1-12 carbon atoms, and a polymerizable group;

n2, n3 and n4 are all 0 or 1;

$C_1$ and $C_2$ are each independently selected from any one of —$CH_2$— and —$CF_2$—;

$Z_1$ is selected from any one of a single bond, methylene and difluoromethylene;

$W_1$ is selected from any one of cyclopropyl, cyclobutyl or cyclopentyl;

and $R_1$ is selected from any one of H, an alkyl group having 1-7 carbon atoms, a F or Cl-substituted alkyl group having 1-7 carbon atoms, an alkoxy group having 1-7 carbon atoms, and a F or Cl-substituted alkoxy group having 1-7 carbon atoms.

Preferably, the general formula of said polymerizable group is P-Sp-X—, wherein P is $CH_2=CW^1—COO—$, $CH_2=CW^2—O—$, $CH_3CH=CH—O—$, $HO—CW^2—W^3—$, $HS—CW^2—W^3—$, $HW^2N—$, $HO—W^2W^3—NH—$, $CH_2=CW^1—CONH—$, $CH_2=CH—(COO)_{k1}$-Phe-$(O)_{k2}—$, Phe-CH=CH—, HOOC—, OCN—, $W^4W^5W^6Si—$,

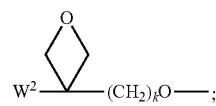

or

wherein $W^1$ is H, F, Cl, CN, phenyl or an alkyl group having 1-5 carbon atoms; $W^2$ and $W^3$ are each independently H or an alkyl group having 1-5 carbon atoms; $W^4$, $W^5$ and $W^6$ are each independently Cl, an oxaalkyl group having 1-5 carbon atoms, or an oxacarbonylalkyl group having 1-5 carbon atoms; Phe is phenylene; k1 and k2 are both 0 or 1 and k is an integer of 0-5; Sp is an alkyl group having 1-25 carbon atoms or a single bond; and X is a single bond, —O—, —S—, —CO—, —COO—, —COO—, —O—COO—, —OCH$_2$—, —C$_2$O—, —SCH$_2$—, —CH$_2$S—, —CH=CHCOO— or —OCO—CH=CH—.

Preferably, the structural formula of the chiral compound of structural formula I is specifically any one of compounds represented by formulae I-1 to I-12:

I-1
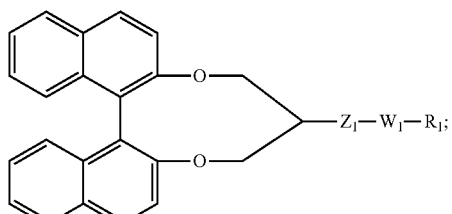

I-2
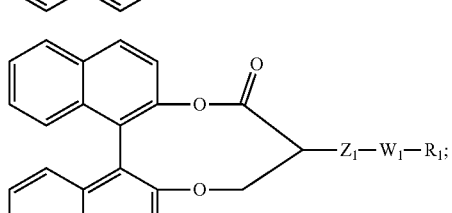

I-3
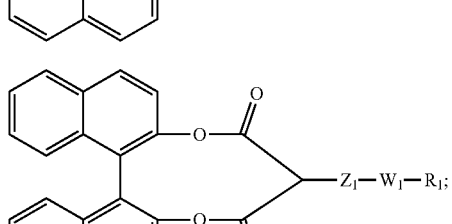

I-4
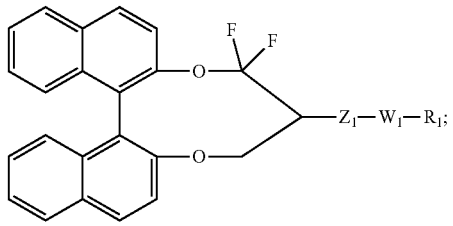

I-5
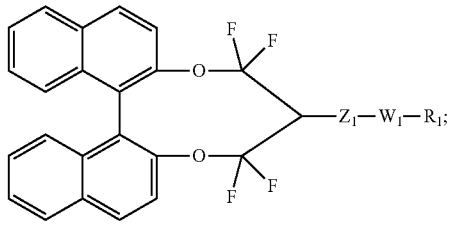

I-6
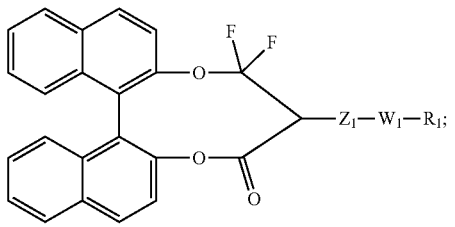

I-7
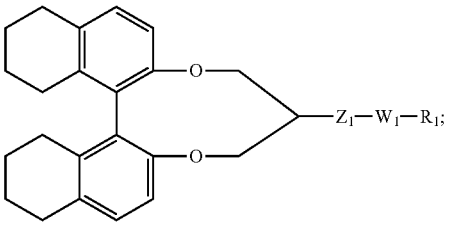

I-8
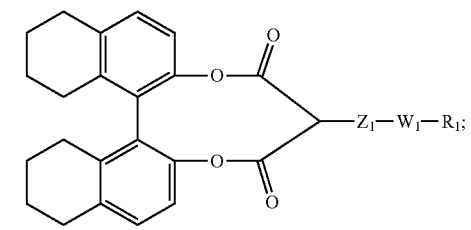

I-9
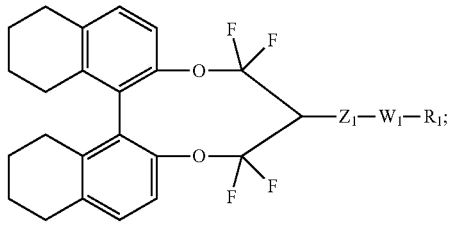

-continued
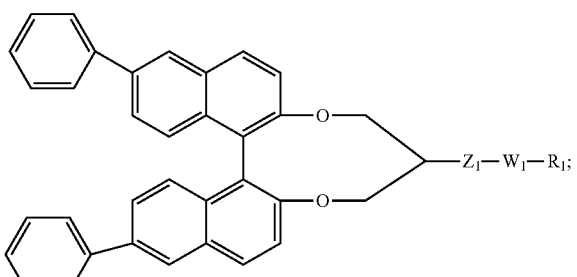
I-10
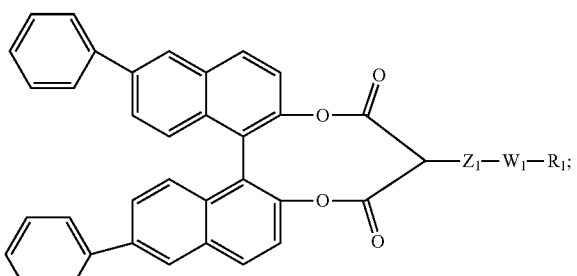
I-11
and
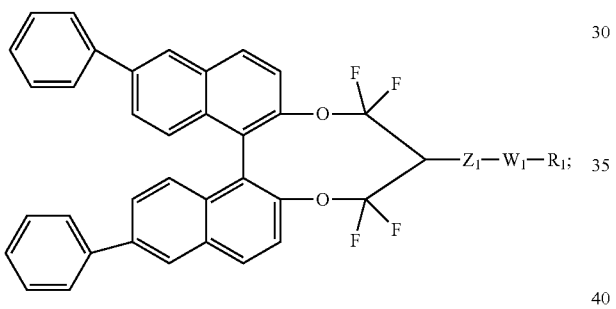
I-12
in formulae I-1 to I-12, the definitions of $Z_1$, $W_1$ and $R_1$ are the same as those mentioned above.
Preferably, the structural formula of the chiral compound of structural formula I is specifically any one of compounds represented by formulae I-13 to I-32:
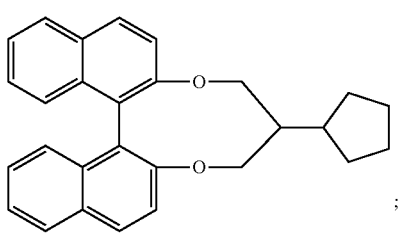
I-13
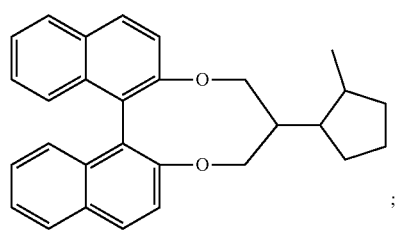
I-14
-continued
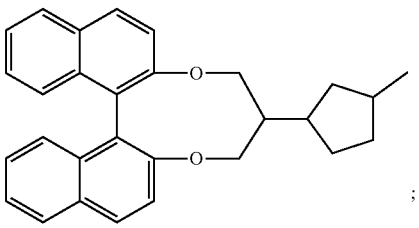
I-15
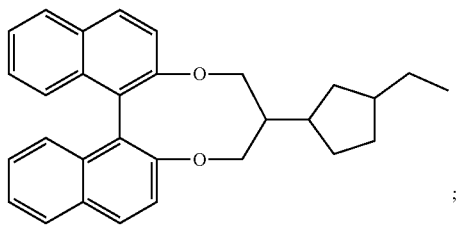
I-16
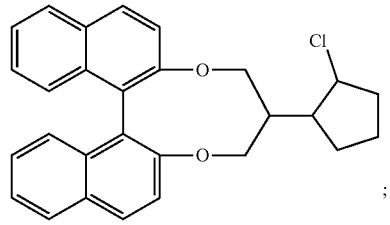
I-17
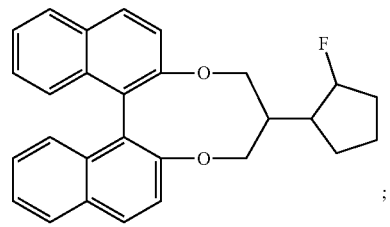
I-18
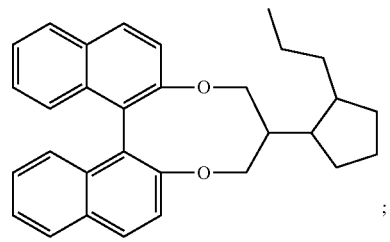
I-19
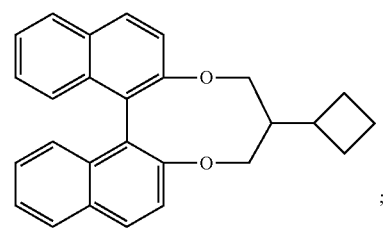
I-20
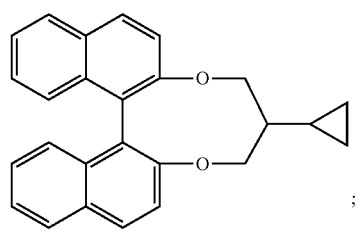
I-21

-continued

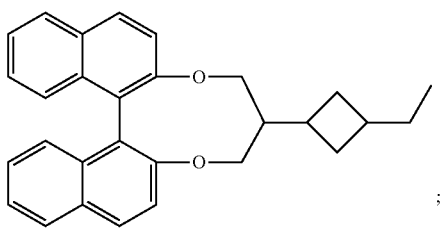

I-22

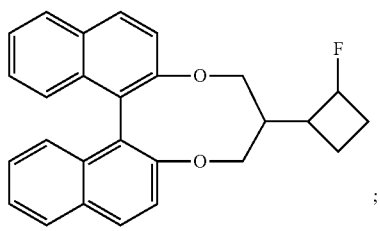

I-23

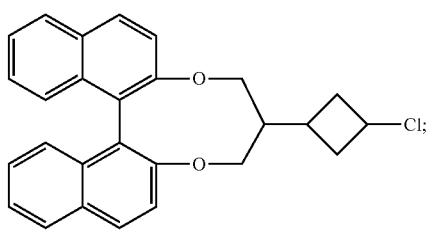

I-24

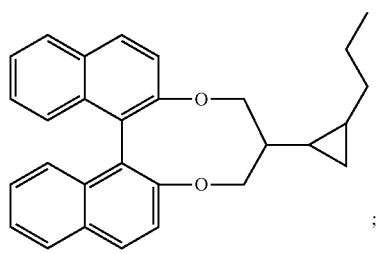

I-25

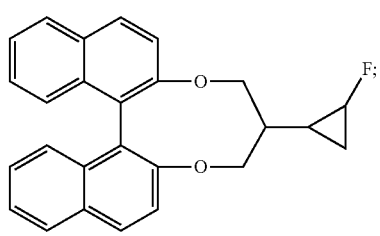

I-26

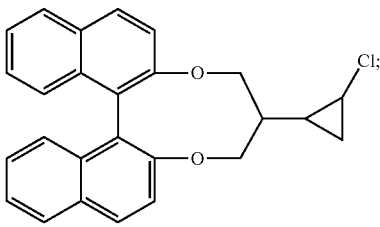

I-27

-continued

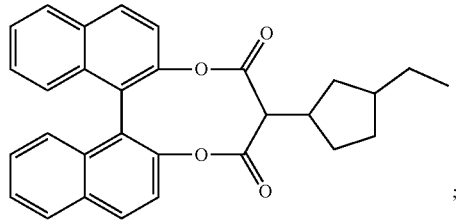

I-28

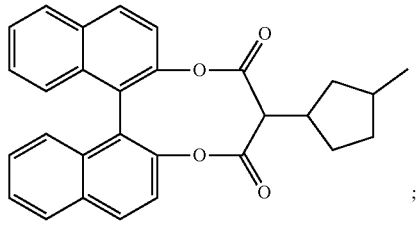

I-29

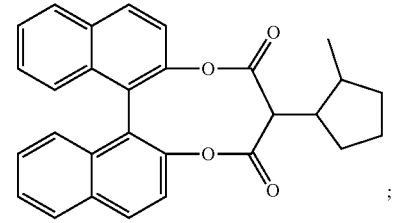

I-30

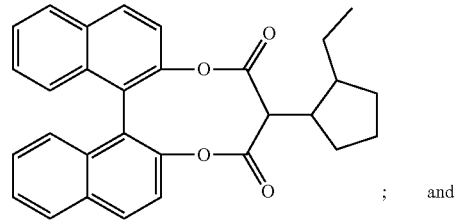

I-31 and

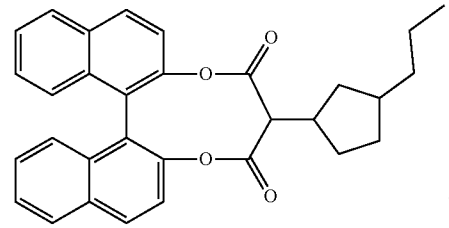

I-32

A second objective of the present invention is to provide a liquid crystal composition comprising the chiral compound.

There is provided a liquid crystal composition comprising at least one of the above-mentioned chiral compounds.

A third objective of the present invention is to provide an optically anisotropic body.

There is provided an optically anisotropic body obtained by polymerizing the above-mentioned liquid crystal composition.

A fourth objective of the present invention is to provide a liquid crystal display device.

There is provided a liquid crystal display device comprising the above-mentioned chiral compound, the above-mentioned liquid crystal composition, or the above-described optically anisotropic body.

Preferably, said liquid crystal display device is a TN, AMD-TN, STN, PS-VA, PSA-VA, PS-IPS, PSA-IPS, PS-IFS, PSA-FFS, multi-stable, blue-phase, 3D or TFT display.

The Present Invention has the Following Beneficial Effects:

The beneficial effects of the present invention lie in that compared with the prior art, the chiral compound proposed by the present invention has a high HTP value and a good solubility; a highly helical and twisted liquid crystal composition can be prepared by adding a small amount of the chiral compound; reducing the addition amount of the chiral compound can reduce the negative effect of the chiral compound on the parameters of the liquid crystal composition; under the conditions of the same addition ratio and the same helical pitch, the chiral compound can reduce the response time of the liquid crystal composition; in addition, the chiral compound has a simple structure and greatly reduces the synthesis cost.

BRIEF DESCRIPTION OF THE DRAWINGS

The particular embodiments of the present invention will be further described below in detail in conjunction with the drawings.

FIG. 1 shows a mass spectrometric detection spectrogram of a chiral compound prepared in Example 1 of the present invention,

DETAILED DESCRIPTION OF EMBODIMENTS

In order to more clearly illustrate the present invention, the present invention will be further described below in conjunction with preferred embodiments and the accompanying drawings. A person skilled in the art should understand that the following contents described in detail are illustrative rather than limiting, and should not limit the scope of protection of the present invention.

In the present invention, preparation methods are all conventional methods unless otherwise specified, and the raw materials used can all be available from open commercial approaches unless otherwise specified.

A method for the synthesis of 5,6,7,8,5',6',7',8'-octahydro-1,1'-binaphthyl-2,2'-diphenyl is disclosed in CRAM, D. J. et al., J. Org. Chem. 1978, 43, 1939-1946.

A method for the synthesis of 6,6'-diphenyl-1,1'-binaphthyl-2,2'-diphenyl is disclosed in TW200833822 A.

The chiral compound of the present invention can be synthesized according to a known method or similarly to the known method, and the known method is, for example, J. J. G. S. van Es, BIEMANS, A. M. and MEIJER, E. W, Tetrahedron: Asymmetry, 1997, 8, 1825-1830.

1) Synthetic route 1 (C1 and C2 are —CH2-):

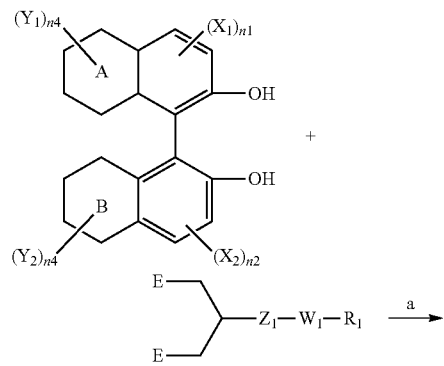

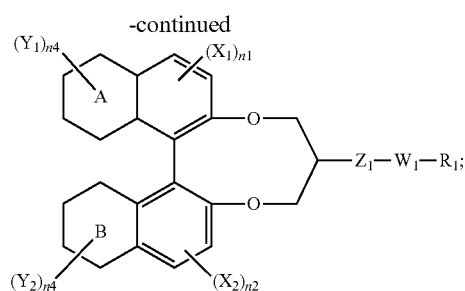

wherein a represents dimethyl formamide, anhydrous potassium carbonate and a temperature of 80° C.;

and E is Br, OTs or OMs.

2) Synthetic route 2 (C1 and C2 are

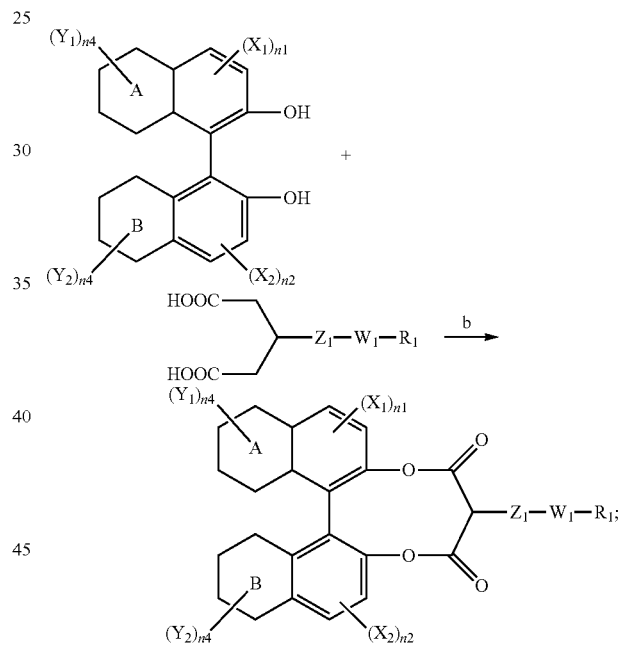

wherein b represents dichloromethane, DCC, MDT and 0-10° C.

3) Synthesis of intermediate

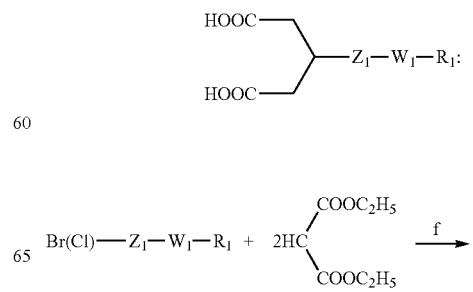

-continued

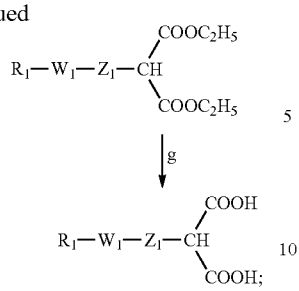

↓ g wherein f represents sodium ethoxide, ethanol and 65° C.; and g represents sodium carbonate, ethanol, water and hydrochloric acid.

4) Synthesis of

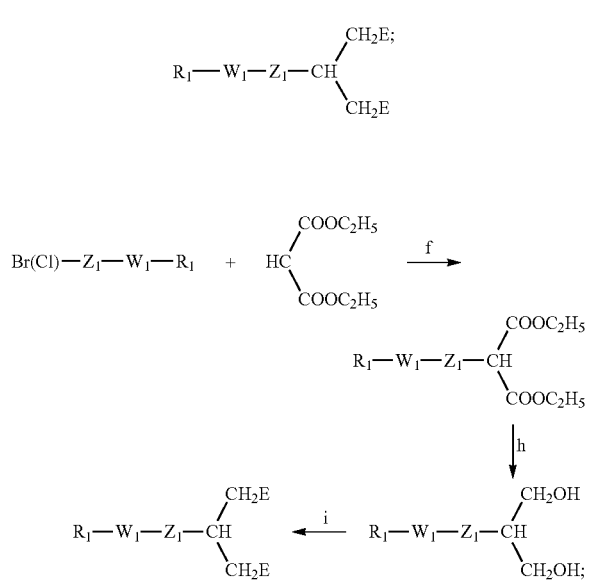

wherein f represents sodium ethoxide, ethanol and 65° C.; and h represents lithium aluminium hydride and THF; and i represents p-toluenesulphonyl chloride or methanesulphonyl chloride, and pyridine or triethylamine.

The helical twisting power (HTP) value of a chiral compound in a liquid crystal composition is given by μm$^{-1}$ according to the formula $$HTP = \frac{1}{pc}.$$

The unit of helical pitch, p, is urn, the concentration of the chiral additive c, is a weight fraction of 0-1 (e.g., 1 wt % is expressed as 0.01 in weight fraction), and the helical pitch p is measured at 20° C.

Example 1

The structural formula of the polymerizable compound is as represented by the following formula:

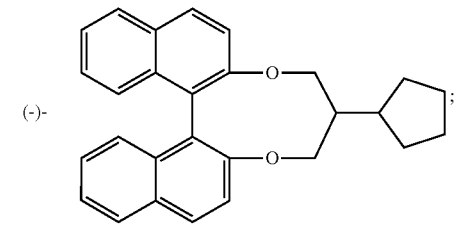

I-13

(-)-

The steps of the preparation thereof are as follows:

Step 1. the preparation route is as follows:

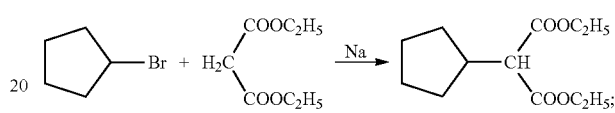

Specific operation procedures of the preparation:

30.7 g (0.20 moles) of diethyl malonate is dissolved in 200 ml of anhydrous ethanol, 4.7 g (0.20 moles) of sodium metal is added under nitrogen protection, 30 g (0.187 moles) of colourless liquid bromocyclopentane is added dropwise after sodium blocks disappeared, and after the addition is complete, the reaction is refluxed for 4 hours.

The reaction liquid is cooled to room temperature, 1 L of water is poured, extraction is carried out with 100 ml petroleum ether for three times, the petroleum ether phases are combined and washed with water twice, the solvent is distilled off under reduced pressure, reduced pressure distillation is carried out to distil off fractions with a boiling point of lower than 95° C./700 Pa, and leaving a high boiling point substance to be the product, so that 31.8 g of diethyl cyclopentylmalonate is obtained with a yield of 74%. Ge: 98.43%:

Step 2. the preparation route is as follows:

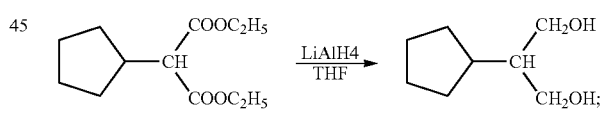

Specific operation procedures of the preparation:

Under nitrogen protection, 7.9 g (0.209 moles) of lithium aluminium hydride is dissolved in 100 ml of tetrahydrofuran, a solution of 31.8 g (0.139 moles) of diethyl cyclopentylmalonate in 50 ml of tetrahydrofuran is added dropwise in an ice-water bath, and after the dropwise addition is complete, the reaction is carried out with stirring at room temperature for 6 hours.

A dilute hydrochloric acid aqueous solution is added dropwise to the reaction liquid until the two phases are transparent and well separated, the aqueous phase is extracted with toluene once, the organic phase is combined and washed with water to neutral, the solvent is distilled off under reduced pressure, and recrystallization is carried out using toluene to obtain 10.6 g of pure cyclopentyl propylene glycol with a yield of 52% and a Gc of 98.9%.

Step 3. the preparation route is as follows:

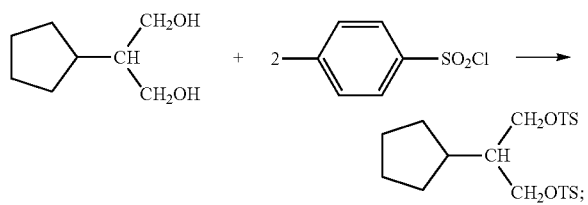

Specific operation procedures of the preparation:

5 g (0.035 moles) of cyclopentyl propylene glycol is charged into a 250 ml three-necked flask, 100 ml of dichloromethane and 10.5 g of triethylamine (0.104 moles) are added, 9.9 g (0.087 moles) of p-toluenesulphonyl chloride is batchwise added, and the reaction is carried out at room temperature overnight.

100 ml of water is added to dissolve the salt, liquid separation is carried out, washing is carried out with water twice, the solvent is distilled off under reduced pressure, and recrystallization is carried out using a mixed solvent of toluene and petroleum ether to obtain 8.3 g of a sulphonate being a white crystal with a yield of 73%.

Step 4. the preparation route is as follows:

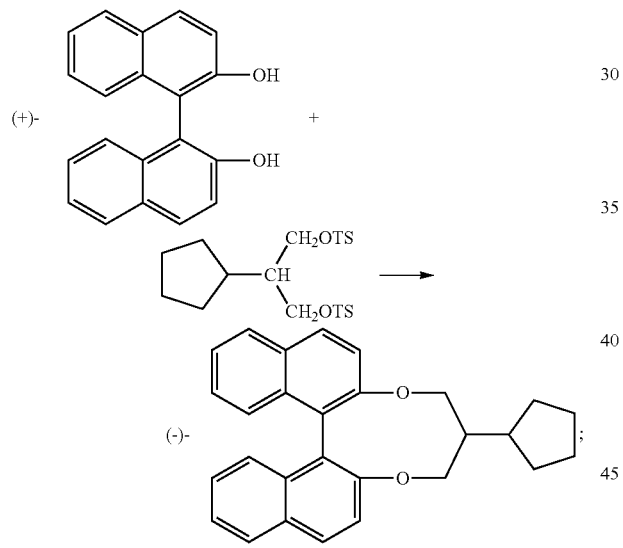

Specific operation procedures of the preparation:

7.2 g (0.022 moles) of R-(+)-binaphthalene diphenol and 5.5 g (0.039 moles) of anhydrous potassium carbonate are charged into a 250 ml three-necked flask, 60 ml of DMF is added, the mixture is heated with stirring to 80° C., then 7 g (0.024 moles) of the sulphonate obtained in Step 3 is batchwise added, and this temperature is maintained for a reaction with stirring for 20 hours.

200 ml of water is poured; extraction is carried out using 50 ml of toluene twice, washing is carried out with water twice, the solvent is distilled off under reduced pressure; and recrystallization is carried out using a mixed solvent of ethanol and toluene to obtain 4.3 g of a white crystal with a yield of 50%. The mass spectrometric detection results are as shown in FIG. 1.

HPLC: 99.8%; and

DSC: 218.23-222.21° C.;

the product obtained from the above-mentioned preparation steps is a. compound represented by formula I-13.

The compound represented by formula I-13 is added to a commercially available liquid crystal SLC101925-000 (available from Shijiazhuang Chengzhi Yonghua Display Material Co., Ltd.) (without containing any chiral agent), a test according to the above-mentioned method shows that the HTP thereof is 107, and the compound at a concentration of 0.166% in weight percentage and a compound in patent CN 103030625 B (purchased from Shijiazhuang Chengzhi Yonghua Display Material Co., Ltd) at a concentration of 0.166% in weight percentage are subjected to a response time comparison test:

the response time of the liquid crystal composition, to which the compound in patent CN 103030625 B has been added at a concentration of 0.166% in weight percentage: $\tau_{on}$=0.48 ms, and $\tau_{off}$=1.85 ms; and the response time of the liquid crystal composition, to which the compound represented by formula I-13 has been added at a concentration of 0.166% in weight percentage: $\tau_{on}$=0.45 ms, and $\tau_{off}$=1.80 ms.

It can be seen that the addition of only a small amount of the compound represented by formula I-13 as prepared in this example to the liquid crystal composition can result in the preparation of a highly helical and twisted (i.e., a small helical pitch) liquid crystal composition, and compared with the chiral compound in the existing patent CN 103030625 B, the HTP value thereof is higher, and the response time can also be reduced including the rise time ($\tau_{on}$) and fall time ($\tau_{off}$).

Compared with the prior art, the chiral compound represented by formula I-13 as provided in this example has a simpler structure, and a higher solubility in the liquid crystal composition, the materials forming the compound are readily available, and the synthesis process is simple, significantly reducing synthesis costs.

Compounds as shown below are prepared using raw materials with different substituents according to the above method, and the following compounds have no substantial difference in HTP value and response time from comparison test results, without any repetition given herein:

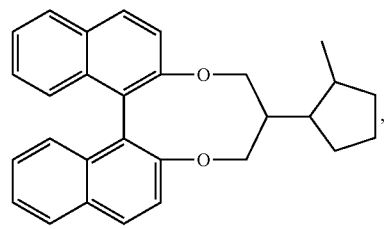

,

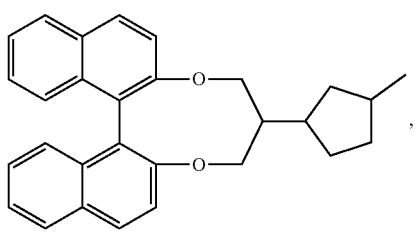

,

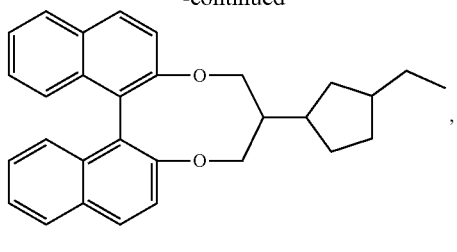

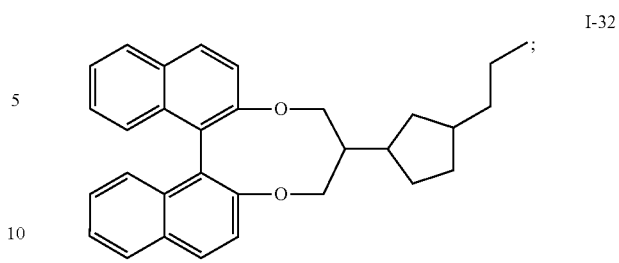

Step 1: This step is the same as Step 1 of Example 1, except that bromocyclopentane is replaced with 3-propyl bromocyclopentane to prepare diethyl 2-(3-propylcyclopentyl) malonate.

Step 2. the preparation route is as follows:

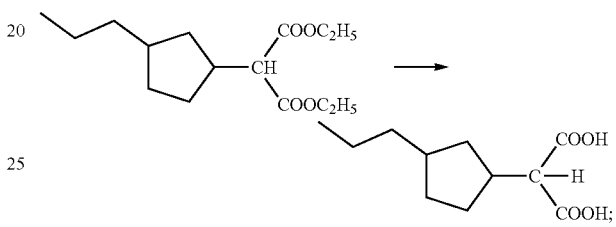

Specific operation procedures of the preparation:

85.2 g (0.3 moles) of diethyl 2-(3-propylcyclopentyl) malonate prepared in Step 1 and 63.6 g (0.6 moles) of sodium carbonate are stirred together in 300 ml of ethanol and 100 ml of water overnight.

300 ml of water is added, the pH is adjusted to strongly acidic using dilute hydrochloric acid, extraction is carried out using 100 ml of toluene twice, washing is carried out with water twice, the solvent is distilled off under reduced pressure, and recrystallization is carried out using toluene to obtain 21.3 g of 2-(4-propylcyclopentyl) malonic acid being a white solid with a yield of 31%.

Step 3. the preparation route is as follows:

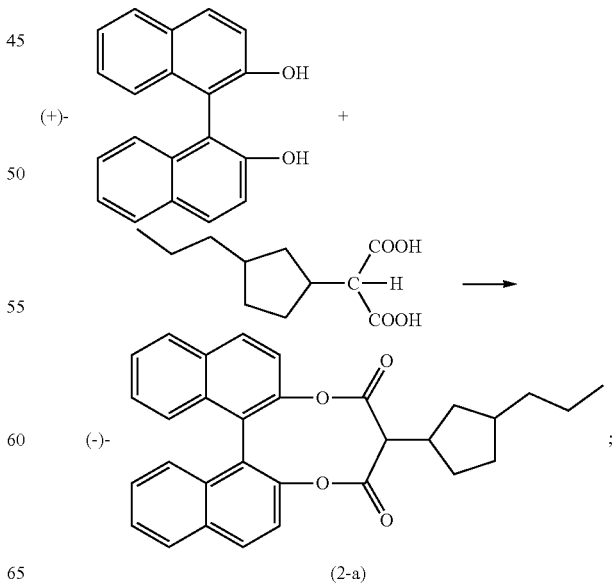

Example 2

The structural formula of the chiral compound is as represented by the following formula:

Specific operation procedures of the preparation:

5.1 g (0.018 moles) of a binaphthalene diphenol is dissolved in 50 ml of dichloromethane, then 9.1 g (0.044 moles) of DCC and 0.3 g of DMAP are added, 4.56 g (0.02 moles) of 2-(4-propylcyclopentyl) malonic acid is batchwise added in an ice-water bath, a low temperature tank is removed after one hour since the addition is complete, and the reaction is carried out with stirring at room temperature for 5 hours.

A precipitated crystal DCU is filtered, the solvent s distilled off under reduced pressure, and recrystallization is carried out using a mixed solvent of ethanol and toluene to obtain 4.56 g of a white crystal (2-a) with a yield of 53%.

Compared with the prior art, the chiral compound represented by formula I-32 as provided in this example has a simpler structure, and a higher solubility in the liquid crystal composition, the materials forming the compound are readily available, and the synthesis process is simple, significantly reducing synthesis costs.

Compounds as shown below are prepared using raw materials with different substituents according to the above method, and the following compounds have no substantial difference in HTP value and response time from comparison test results, without any repetition given herein:

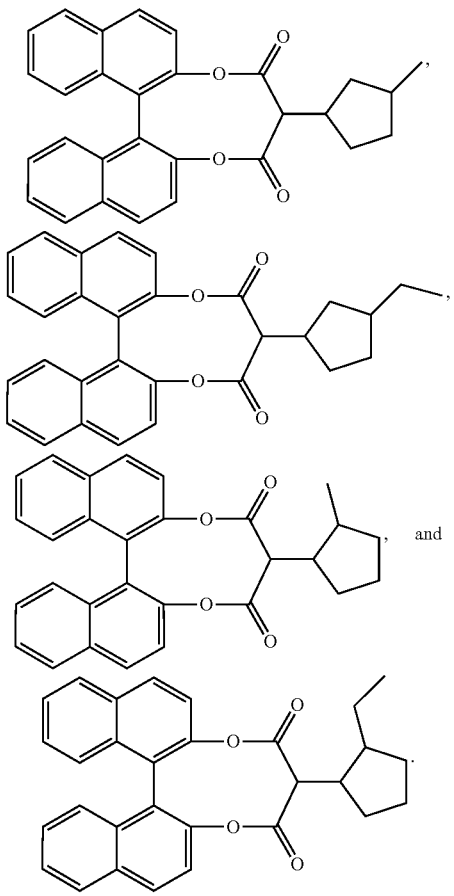

Example 3

The structural formula of the chiral compound is as represented by the following formula:

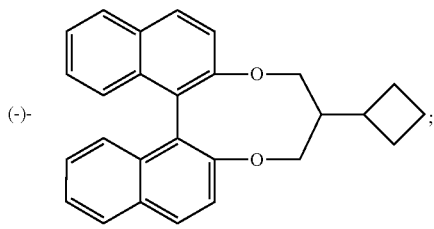

Step 1: This step is the same as Step 1 of Example 1, except that bromocyclopentane is replaced with bromocyclobutane to prepare diethyl cyclobutylmalonate:

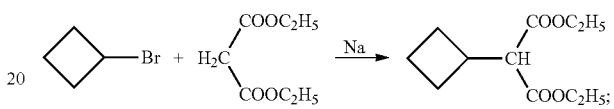

Specific operation procedures of the preparation:

30 g (0.18 moles) of diethyl malonate is dissolved in 200 ml of anhydrous ethanol, 5.1 g (0.22 moles) of sodium metal is added under nitrogen protection, 30 g (0.157 moles) of colourless liquid bromocyclobutane is added dropwise after sodium blocks disappeared, and after the addition is complete, the reaction is refluxed for 4 hours.

1 L of water is poured, extraction is carried out with 100 ml of petroleum ether for three times, the petroleum ether phases are combined and washed with water twice, the solvent is distilled off under reduced pressure, reduced pressure distillation is carried out to distil off fractions with boiling points of lower than 112° C./920 Pa, and leaving a high boiling point substance to be the product, so that 27.8 g of diethyl cyclobutylmalonate is obtained with a yield of 48%.

Step 2. the preparation route is as follows:

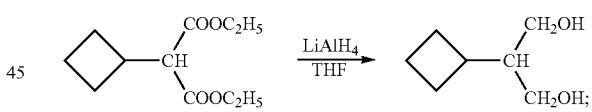

Specific operation procedures of the preparation:

Under nitrogen protection, 3.08 g (0.079 moles) of lithium aluminium hydride is dissolved in 50 ml of tetrahydrofuran, a solution of 25 g (0.069 moles) of diethyl cyclobutylmalonate in 50 ml of tetrahydrofuran is added dropwise in an ice-water bath, and after the dropwise addition is complete, the reaction is carried out with stirring at room temperature for 6 hours.

A dilute hydrochloric acid aqueous solution is added dropwise to the reaction liquid until the two phases are transparent and well separated, the aqueous phase is extracted with toluene once, the organic phase is combined and washed with water to neutral, the solvent is distilled off under reduced pressure, and recrystallization is carried out using toluene to obtain 8.0 g of cyclobutyl propylene glycol with a yield of 50%.

HPLC: 99.8%; and

Ge: 98.9%.

Step 3. the preparation route is as follows:

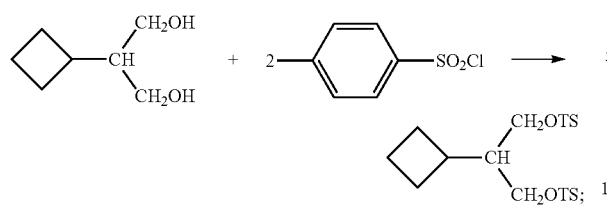

Specific operation procedures of the preparation:

8.0 g (0.04 moles) of cyclobutyl propylene glycol is charged into a 250 ml three-necked flask, 30 ml of dichloromethane and 30 ml of a pyridine are added; 20.1 g (0.1 moles) of p-toluenesulphonyl chloride is batchwise added, and the reaction is carried out at room temperature overnight.

100 ml of water is added to dissolve the salt, 30 ml of toluene is added for liquid separation, the aqueous phase is extracted using 20 ml of toluene once, the toluene layers are combined and washed with water twice, the solvent is distilled off under reduced pressure, and recrystallization is carried out using a mixed solvent of toluene and petroleum ether to obtain 13.5 g of a sulphonate being a white crystal with a yield of 73%.

Step 4. the preparation route is as follows:

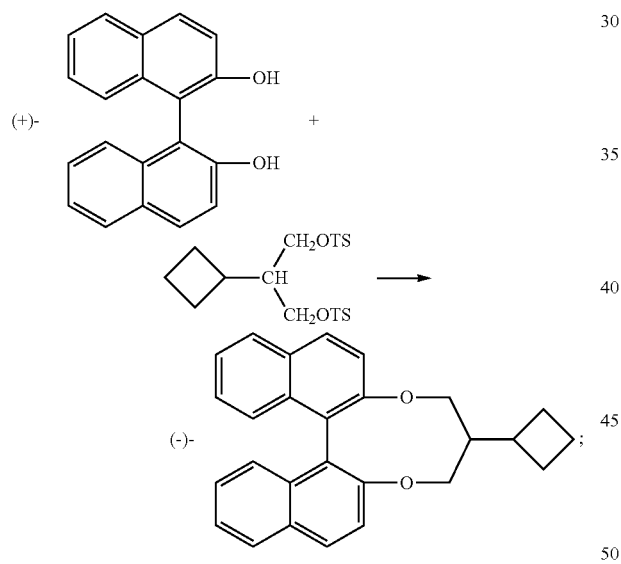

Specific operation procedures of the preparation:

6.9 g (0.024 moles) of R-(±)-binaphthalene diphenol and 3.59 g (0.026 moles) of anhydrous potassium carbonate are charged into a 250 ml three-necked flask, 60 ml of DMF is added, the mixture is heated with stirring to 80° C., 13.5 g (0.02 moles) of the sulphonate obtained in Step 3 is then batchwise added, and this temperature is maintained for a reaction with stirring for 20 hours.

200 ml of water is poured, extraction is carried out using 50 ml of toluene twice, washing is carried out with water twice, the solvent is distilled off under reduced pressure, and recrystallization is carried out using a mixed solvent of ethanol and toluene to obtain 5.7 g of a white crystal with a yield of 60%.

HPLC: 99.8%; and

DSC: 229° C.

Compared with the prior art, the chiral compound represented by formula I-20 as provided in this example has a simpler structure, and a higher solubility in the liquid crystal composition, the materials forming the compound are readily available, and the synthesis process is simple, significantly reducing synthesis costs.

Compounds as shown below are prepared using raw materials with different substituents according to the above method, and the following compounds have no substantial difference in HTP value and response time from comparison test results, without any repetition given herein:

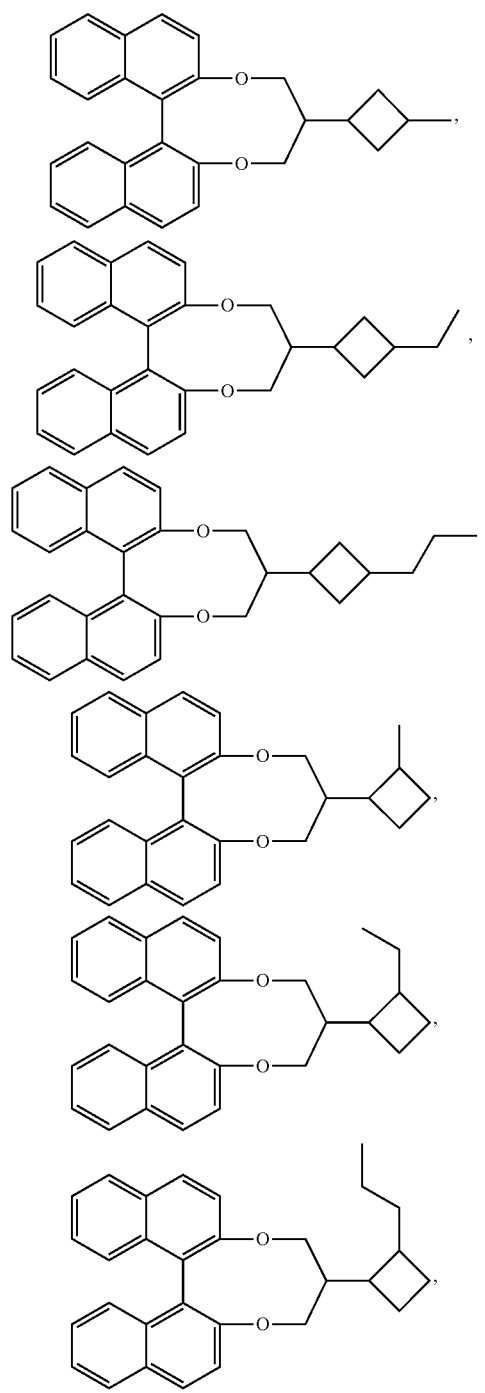

-continued

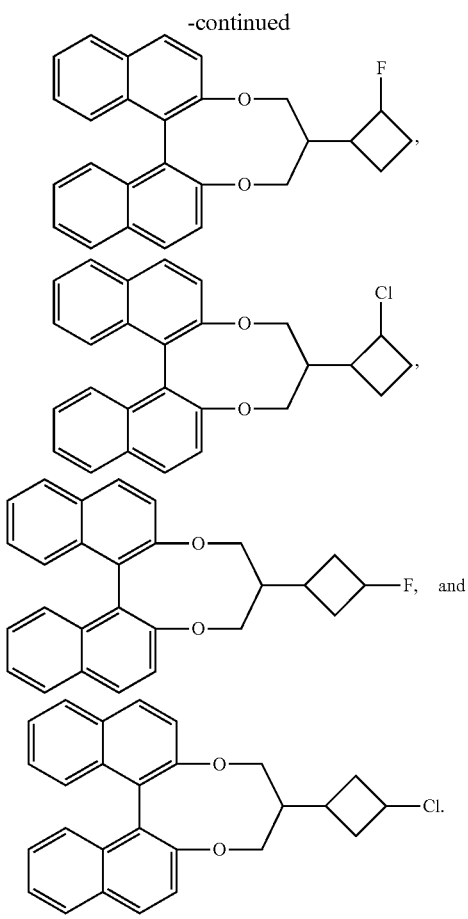

Obviously, the above-mentioned embodiments of the present invention are merely examples for clearly illustrating the present invention, rather than limiting the embodiments of the present invention; for a person of ordinary skill in the art, on the basis of the above description, other variations or changes in different forms may also be made, all the embodiments cannot be provided exhaustively herein, and any obvious variation or change derived from the technical solution of the present invention is still within the scope of protection of the present invention.

The invention claimed is:

1. A chiral compound, characterized in that the structural formula of said chiral compound is as represented by the following formula I:

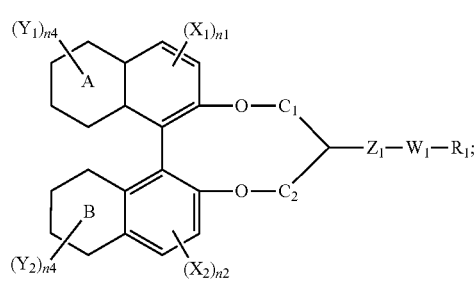

in said formula I, A and B are each independently selected from any one of cyclohexyl, phenyl, phenyl with at least one —CH— substituted with N, and cyclohexyl with at least one —CH$_2$— substituted with S or O;

$X_1$, $X_2$, $Y_1$ and $Y_2$ are each independently selected from at least one of H, F, CN, an alkyl group having 1-12 carbon atoms, an alkoxy group having 1-12 carbon atoms, and a polymerizable group;

n1, n2, n3 and n4 are all 0 or 1;

$C_1$ and $C_2$ are each independently selected from any one of —CH$_2$— and —CF$_2$—;

$Z_1$ is selected from any one of a single bond, methylene and difluoromethylene;

$W_1$ is selected from any one of cyclopropyl, cyclobutyl or cyclopentyl;

and $R_1$ is selected from any one of H, an alkyl group having 1-7 carbon atoms, a F or Cl-substituted alkyl group having 1-7 carbon atoms, an alkoxy group having 1-7 carbon atoms, and a F or Cl-substituted alkoxy group having 1-7 carbon atoms.

2. The chiral compound according to claim 1, characterized in that the general formula of said polymerizable group is P-Sp-X—, wherein P is CH$_2$=CW$^1$—COO—, CH$_2$=CW$^2$—O—, CH$_3$CH=CH—O—, HO—CW$^2$—W$^3$—, HS—CW$^2$—W$^3$—, HW$^2$N—, HO—W$^2$W$^3$—NH—, CH$_2$=CW$^1$—CONH—, CH$_2$=CH—(COO)$_{k1}$-Phe-(O)$_{k2}$—, Phe-CH=CH—, HOOC—, OCN—, W$^4$W$^5$W$^6$Si—,

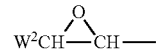

or

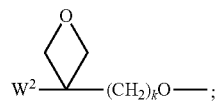

wherein W$^1$ is H, F, Cl, CN, phenyl or an alkyl group having 1-5 carbon atoms; W$^2$ and W$^3$ are each independently H or an alkyl group having 1-5 carbon atoms;

W$^4$, W$^5$ and W$^6$ are each independently Cl, an oxaalkyl group having 1-5 carbon atoms, or an oxacarbonylalkyl group having 1-5 carbon atoms;

Phe is phenylene; k1 and k2 are both 0 or 1 and k is an integer of 0-5;

Sp is an alkyl group having 1-25 carbon atoms or a single bond; and

X is a single bond, —O—, —S—, —CO—, —COO—, —COO—, —O—COO—, —OCH$_2$—, —CH$_2$O—, —SCH$_2$—, —CH$_2$S—, —CH=CHCOO— or —OCO—CH=CH—.

3. The chiral compound according to claim 1, characterized in that the structural formula of the chiral compound of structural formula I is specifically any one of compounds represented by formulae I-1 to I-12:

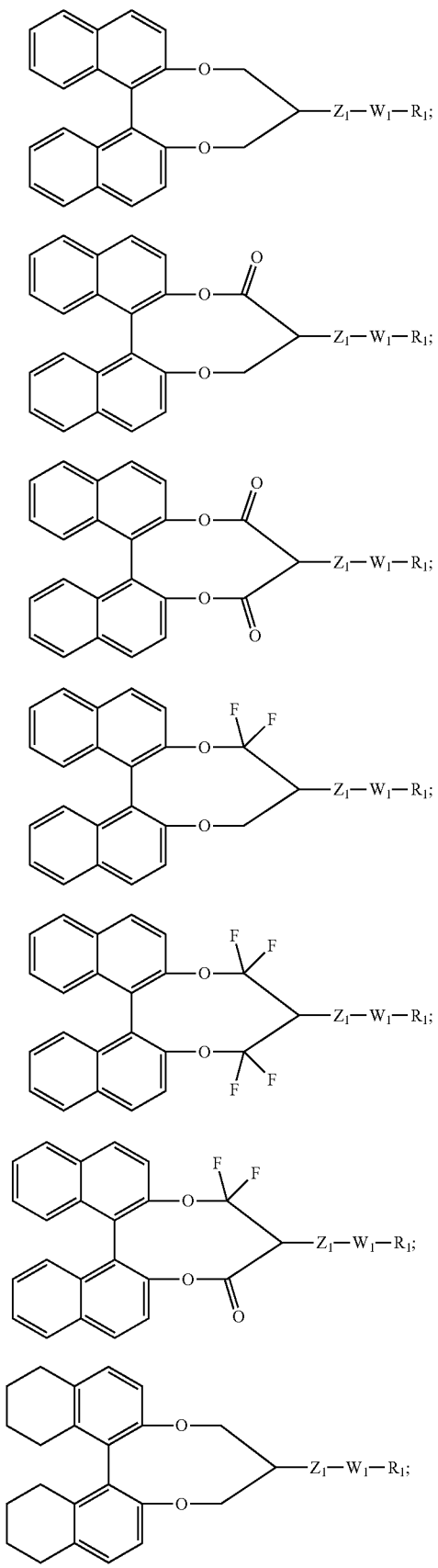
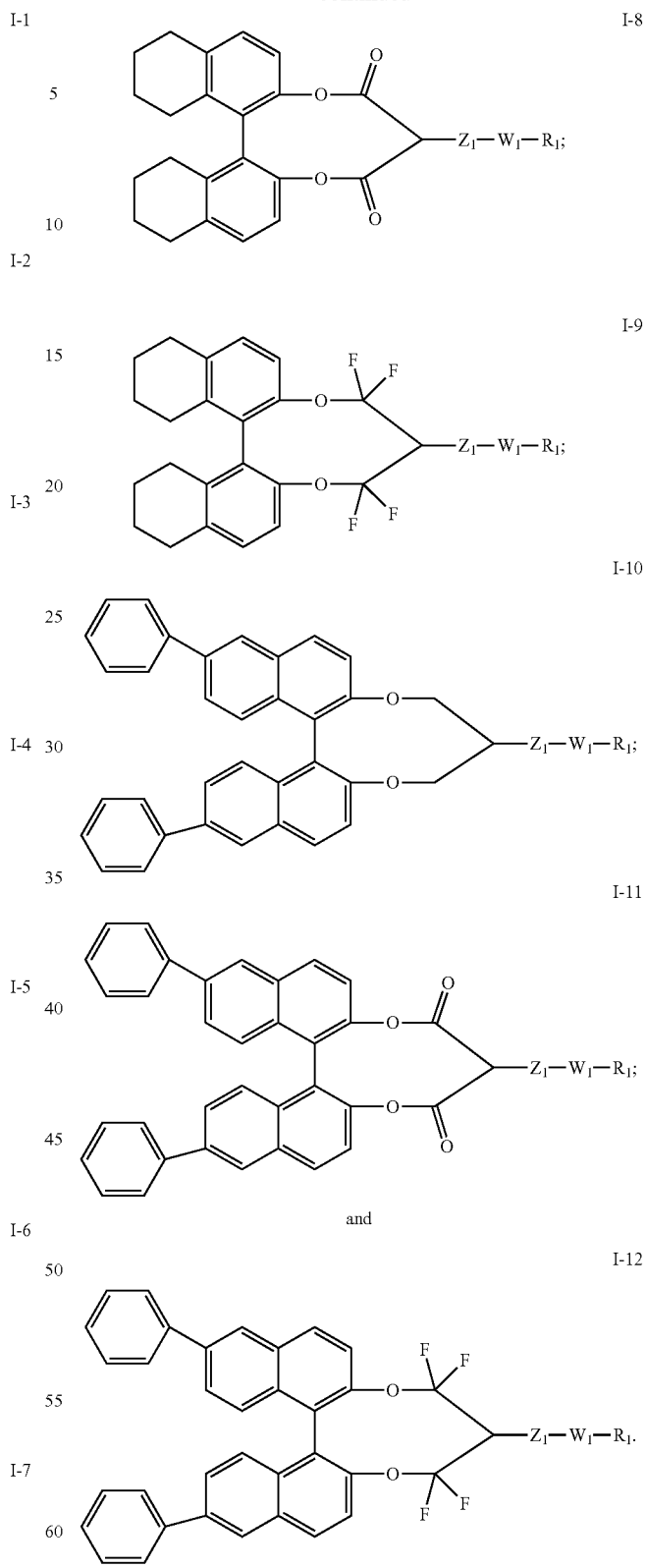
4. The chiral compound according to claim 1, characterized in that the structural formula of the chiral compound of structural formula I is specifically any one of compounds represented by formulae I-13 to I-32:

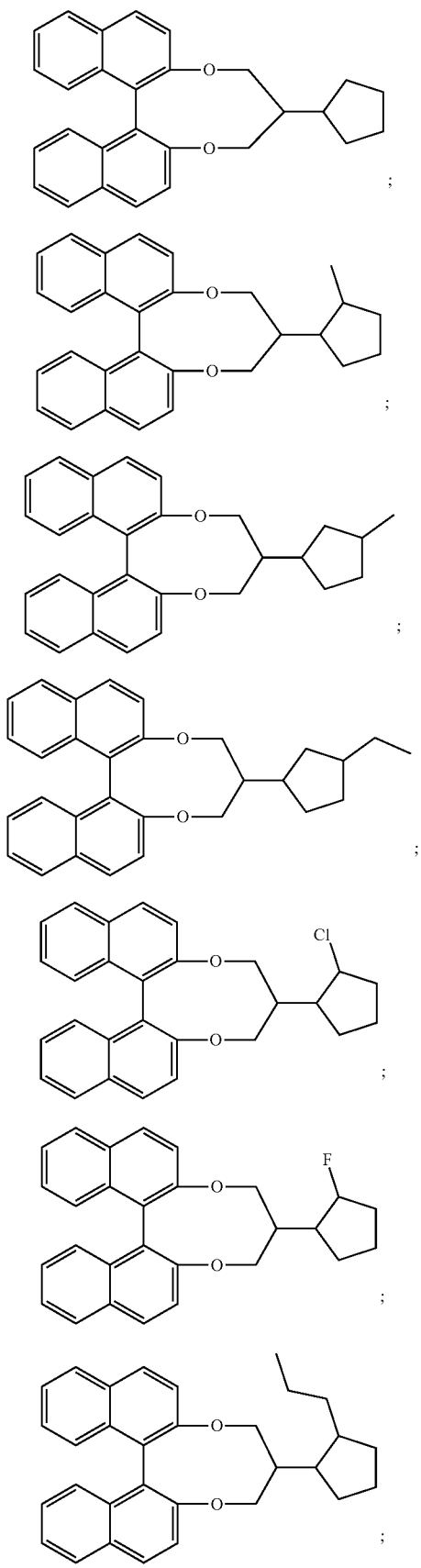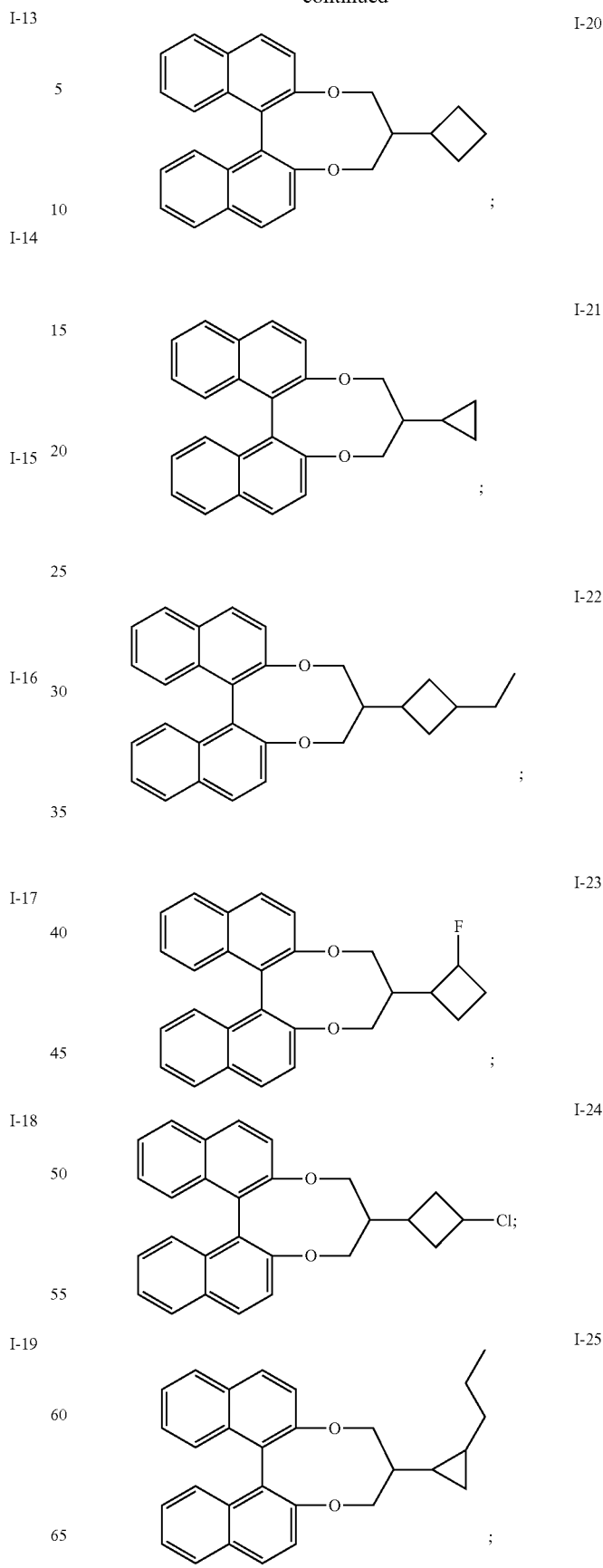

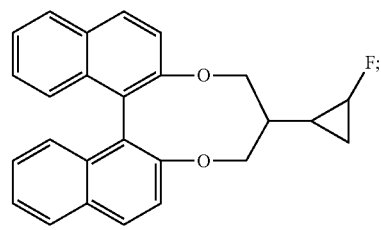 I-26

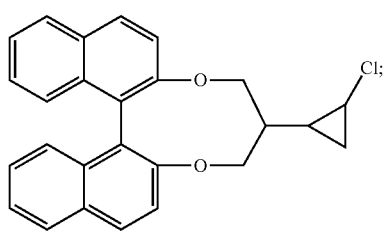 I-27

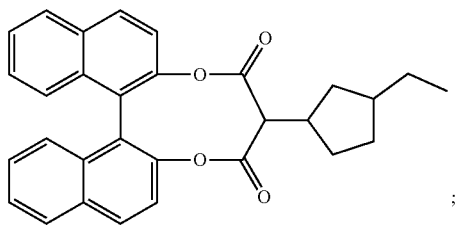 I-28

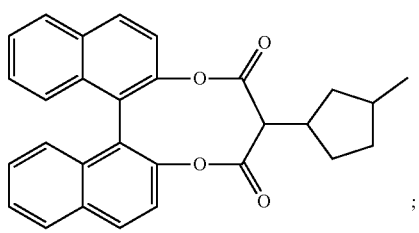 I-29

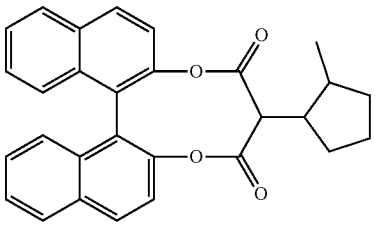 I-30

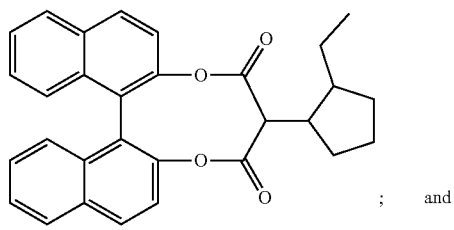 I-31 and

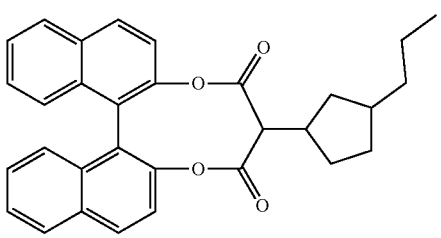 I-32

5. A liquid crystal composition, characterized in that said liquid crystal composition comprises at least one chiral compound of claim 1.

6. An optically anisotropic body, characterized in that said optically anisotropic body is obtained by polymerizing the liquid crystal composition according to claim 5.

7. A liquid crystal display device, characterized in that said liquid crystal display device comprises the chiral compound of claim 1, a liquid crystal composition comprising the chiral compound, or an optically anisotropic body obtained by polymerizing the liquid crystal composition.

8. The liquid crystal display device according to claim 7, characterized in that said liquid crystal display device is a TN, AMD-TN, STN, PS-VA, PSA-VA, PS-IPS, PSA-IPS, PS-FFS, PSA-FFS, multi-stable, blue-phase, 3D or TFT display.

* * * * *